(12) United States Patent
Akatsuka et al.

(10) Patent No.: US 10,399,592 B2
(45) Date of Patent: Sep. 3, 2019

(54) DRIVE ASSIST DEVICE

(71) Applicant: DENSO CORPORATION, Kariya, Aichi-pref. (JP)

(72) Inventors: Hisaya Akatsuka, Kariya (JP); Daiji Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/644,130

(22) Filed: Jul. 7, 2017

(65) Prior Publication Data

US 2018/0009466 A1    Jan. 11, 2018

(30) Foreign Application Priority Data

Jul. 11, 2016  (JP) .................................. 2016-136948

(51) Int. Cl.
| | |
|---|---|
| *B62D 5/04* | (2006.01) |
| *B62D 6/04* | (2006.01) |
| *B62D 6/08* | (2006.01) |
| *B60W 30/00* | (2006.01) |
| *G05B 13/02* | (2006.01) |

(52) U.S. Cl.
CPC .......... *B62D 5/0463* (2013.01); *B60W 30/00* (2013.01); *B62D 6/04* (2013.01); *B62D 6/08* (2013.01); *G05B 13/0265* (2013.01)

(58) Field of Classification Search
CPC .............. B60C 23/0471; B60C 23/044; B60C 23/0442; B60C 23/0472; B60C 23/0479
See application file for complete search history.

(56) References Cited

U.S. PATENT DOCUMENTS

| | | | | |
|---|---|---|---|---|
| 9,020,697 | B2 * | 4/2015 | Ricci | H04W 4/21 |
| | | | | 701/36 |
| 9,082,238 | B2 * | 7/2015 | Ricci | G06F 21/31 |
| 9,082,239 | B2 * | 7/2015 | Ricci | B60Q 1/00 |
| 9,147,298 | B2 * | 9/2015 | Ricci | B60Q 1/00 |
| 9,317,983 | B2 * | 4/2016 | Ricci | H04W 4/21 |
| 9,373,207 | B2 * | 6/2016 | Ricci | B60Q 1/00 |
| 9,378,601 | B2 * | 6/2016 | Ricci | B60Q 1/00 |
| 9,384,609 | B2 * | 7/2016 | Ricci | B60Q 1/00 |
| 9,412,273 | B2 * | 8/2016 | Ricci | G06F 16/25 |
| 9,483,796 | B1 * | 11/2016 | Blessman | G06Q 40/08 |
| 9,524,597 | B2 * | 12/2016 | Ricci | H04W 4/21 |

(Continued)

FOREIGN PATENT DOCUMENTS

| | | |
|---|---|---|
| JP | 2008-221872 | 9/2008 |
| JP | 2010-105454 A | 5/2010 |

(Continued)

*Primary Examiner* — Jean Paul Cass
(74) *Attorney, Agent, or Firm* — Knobbe, Martens, Olson & Bear LLP

(57) ABSTRACT

In a drive assist system, a map data acquiring section acquires at least one of a driver's operation ability and a load of a vehicle. An adjustment section determines an assist control amount as a control parameter of drive assist for the vehicle so that a degree of the driver's operation is increased according to reduction of the driver's operation ability or increasing of the load of the vehicle. An assist control amount calculation section transmits the assist control amount to a steering motor and a notification section so as to execute the drive assist for the vehicle.

10 Claims, 8 Drawing Sheets

(56) References Cited

U.S. PATENT DOCUMENTS

| | | | |
|---|---|---|---|
| 9,535,497 B2 * | 1/2017 | Rose | G06F 3/013 |
| 9,536,361 B2 * | 1/2017 | Ricci | H04W 4/21 |
| 9,541,633 B2 * | 1/2017 | Rybski | G01S 7/4004 |
| 9,547,373 B2 * | 1/2017 | Hsiao | G06F 3/0304 |
| 9,575,007 B2 * | 2/2017 | Rao | G01N 21/88 |
| 9,646,439 B2 * | 5/2017 | Ricci | H04W 4/21 |
| 9,685,098 B1 * | 6/2017 | Kypri | G09B 19/167 |
| 9,716,964 B1 * | 7/2017 | Sheng | H04W 4/20 |
| 9,718,441 B2 * | 8/2017 | Cogill | B60R 25/30 |
| 9,787,818 B2 * | 10/2017 | Kwon | H04W 4/90 |
| 9,826,500 B1 * | 11/2017 | Boss | H04W 24/08 |
| 9,840,166 B2 * | 12/2017 | Taylor | B60N 2/002 |
| 9,855,817 B2 * | 1/2018 | Hsiao | B60K 11/04 |
| 9,883,209 B2 * | 1/2018 | Ricci | H04W 4/21 |
| 9,928,734 B2 * | 3/2018 | Newman | B60Q 5/005 |
| 9,937,860 B1 * | 4/2018 | Moradi-Pari | B60Q 9/008 |
| 9,946,906 B2 * | 4/2018 | Ricci | H04L 9/321 |
| 9,954,260 B2 * | 4/2018 | Ho | H01M 10/63 |
| 9,963,106 B1 * | 5/2018 | Ricci | B60R 25/2018 |
| 9,984,572 B1 * | 5/2018 | Newman | G06Q 10/02 |
| 2009/0091435 A1 * | 4/2009 | Bolourchi | B60K 28/066 340/435 |
| 2014/0125474 A1 * | 5/2014 | Gunaratne | G08G 1/163 340/439 |
| 2014/0306826 A1 * | 10/2014 | Ricci | H04W 4/21 340/573.1 |
| 2016/0121924 A1 * | 5/2016 | Norstad | B62D 5/0406 701/42 |
| 2016/0262682 A1 | 9/2016 | Omi | |
| 2017/0190337 A1 * | 7/2017 | Singh | B60W 50/14 |
| 2017/0361848 A1 * | 12/2017 | Noto | B60W 10/18 |
| 2018/0022382 A1 | 1/2018 | Akatsuka et al. | |
| 2018/0290686 A1 * | 10/2018 | Minoiu Enache | B62D 15/0265 |

FOREIGN PATENT DOCUMENTS

| | | |
|---|---|---|
| JP | 2012-086640 | 5/2012 |
| JP | 2014-082585 | 5/2014 |
| JP | 2015-128989 | 7/2015 |

* cited by examiner

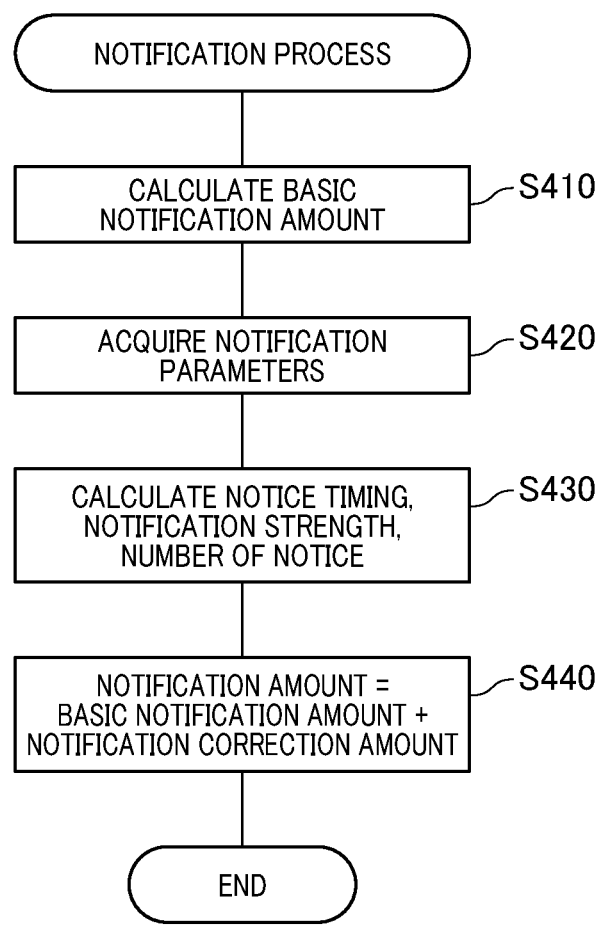

DRIVE ASSIST DEVICE

CROSS-REFERENCE TO RELATED APPLICATION

This application is related to and claims priority from Japanese Patent Application No. 2016-136948 filed on Jul. 11, 2016, the contents of which are hereby incorporated by reference.

BACKGROUND OF THE INVENTION

1. Field of the Invention

The present invention relates to drive assist devices for assisting a driver's operation of an own vehicle, and providing safe and comfortable steering operation of the own vehicle.

2. Description of the Related Art

A patent document 1, Japanese patent laid open publication No. 2010-105454 has disclosed a drive assist device for assisting driver's steering operation on the basis of control parameters of a steering device which have been adjusted due to road conditions such as a clear roadway, a blind bend and a sharp bend in a road, rain, snow, etc.

However, because the drive assist device disclosed in the patent document 1 previously described does not consider driver's operation characteristics of the steering device and vehicle characteristics, it is difficult to always provide optimum and comfortable drive assist due to various driving condition of the own vehicle.

SUMMARY

It is therefore desired to provide a drive assist device capable of providing safety, and comfortable and appropriate steering operation to a driver of the own vehicle.

An exemplary embodiment provides a drive assist device which executes a drive assist of an own vehicle. The drive assist device has a computer system including a central processing unit. The computer system is configured to provide an ability acquiring section, a control amount determination section and an assist execution section. The ability acquiring section acquires at least one of a driver's operation ability of the own vehicle, an operating load of the own vehicle.

The control amount determination section determines an assist control amount as a control parameter of the drive assist of the own vehicle so that a degree of the driver's operation for the own vehicle is increased according to reduction of the degree of the driver's operation ability, and increasing of the operating load of the own vehicle. The assist execution section transmits the assist control amount to the assist section in order to execute drive assist for the own vehicle.

The drive assist device having the structure previously described increases the magnitude of the assist control amounts so as to increase the degree of the drive operation by the driver of the own vehicle according to reduction of the driver's operation ability or increasing of the load applied to the own vehicle. This control executes appropriate drive assist and provides comfortable drive assist control to the driver of the own vehicle.

BRIEF DESCRIPTION OF THE DRAWINGS

A preferred, non-limiting embodiment of the present invention will be described by way of example with reference to the accompanying drawings, in which:

FIG. 10 is a flow chart showing a notification process executed by the control section 10 in the drive assist system 1 shown in FIG. 1;

DETAILED DESCRIPTION OF THE PREFERRED EMBODIMENTS

Figure 1:
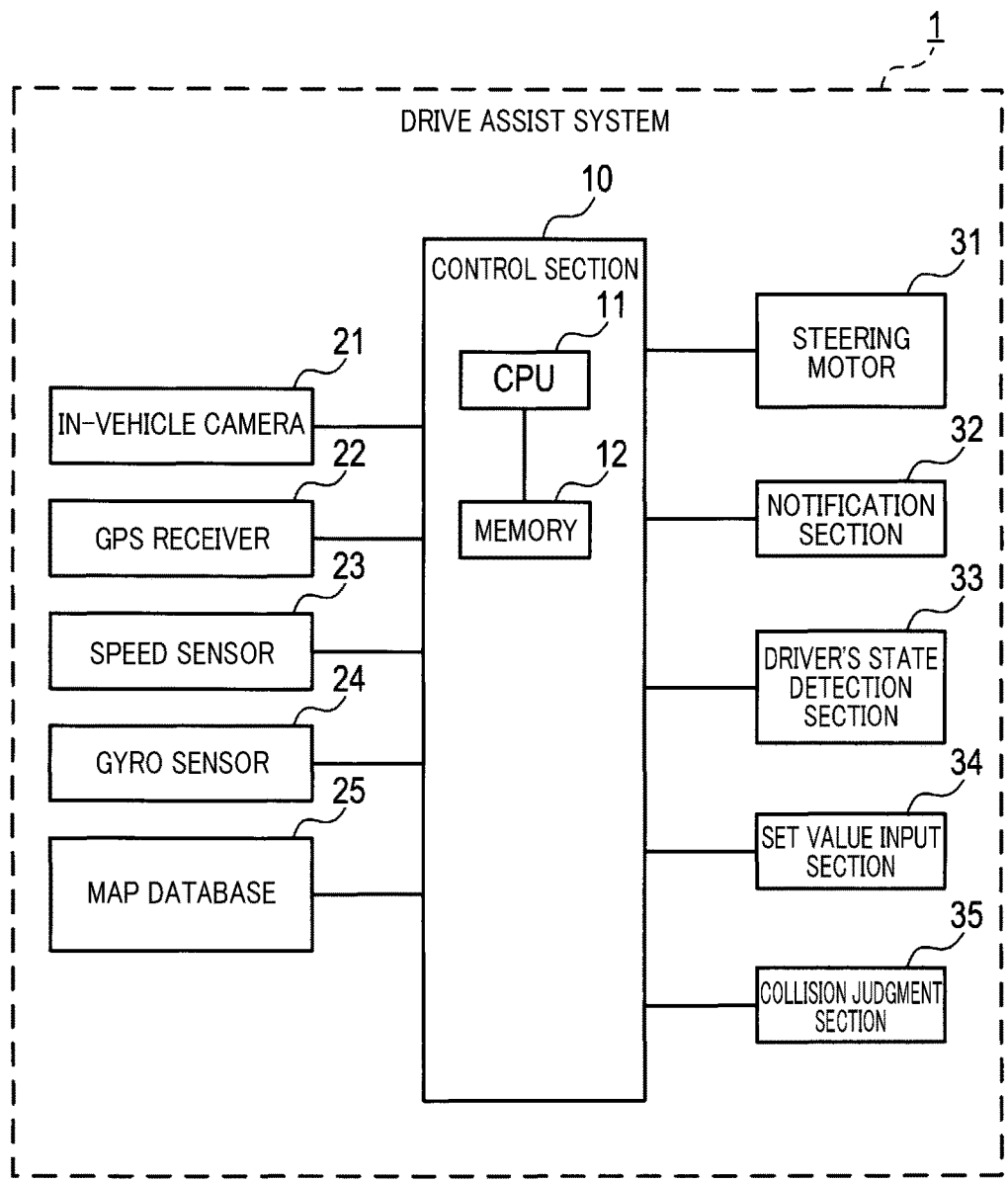
FIG. 1 is a block diagram showing a structure of a drive assist system 1 according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of the drive assist system 1 as the drive assist device according to an exemplary embodiment with reference to FIG. 1 to FIG. 13.

(Structure)

FIG. 1 is a block diagram showing a structure of the drive assist system 1 according to the exemplary embodiment. The drive assist system 1 shown in FIG. 1 is mounted on an own vehicle, and assists the driver's vehicle operation. In particular, the drive assist system 1 according to the exemplary embodiment assists driver's steering operation using a steering wheel of the own vehicle. The drive assist control assists a part or all of the driver's operation of the own vehicle.

The drive assist system 1 shown in FIG. 1 has the control section 10. The drive assist system 1 has an in-vehicle camera 21, a GPS (Global Positioning System) receiver, a speed sensor 23, a gyro sensor 24, a map database 25, a steering motor 31, a notification section 32, a driver's state detection section 33, a set value input section 34, and a collision judgment section 35. The GPS represents a space-based radio-navigation system.

The in-vehicle camera 21 captures a forward view of the own vehicle and transmits a captured image to the control section 10. The GPS receiver 22 is a well-known device which receives radio waves transmitted from a GPS satellite, and detects a current position of the own vehicle on a road on the basis of the received radio waves.

The speed sensor 23 is a well-known sensor which detects a current speed of the own vehicle. The gyro sensor is a well-known device which detects an angular velocity of the own vehicle. The map database 25 stores known map information in which latitude and longitude on the earth correspond to road data. For example, the road data show a relationship between the location or position of a road, road shape information (which will be explained later), etc.

In order to specify the direction of the road on which the own vehicle is driving, it is sufficient to use the road data including directional information which represents which direction the road is linked. That is, it is sufficient for the road data to show a curvature of a road and a degree of a slope at every position on the road. The exemplary embodiment uses the road data which include a curvature at an optional position on a road, and a degree of a slope at optional position on the road.

The steering motor 31 provides a torque, i.e. a rotation power to a mechanical assembly of a known power steering control device so as to change a steering angle. That is, the control section 10 instructs the steering motor 31 to provide a torque to the mechanical assembly in the power steering control device. This means that the control section 10 executes the drive assist.

A known display device, one or more speakers, a vibration device, etc. form the notification section 32. That is, when receiving information transmitted from the drive assist system 1, the notification section 32 notifies the received information to the driver of the own vehicle. The notification section 32 changes a degree of the notification to be supplied to the driver of the own vehicle on the basis of the instruction transmitted from the control section 10. The degree of the notification to be supplied to the driver of the own vehicle represents an image display state, a sound state, a vibration state, etc. The image display state is a size of an image, a color of the image, a blinking speed of the image, the number of notifications, a time length of the notification, etc. The sound state represents a volume and/or tone of sound, etc. The vibration state represents a strength of a vibration.

The driver's state detection section 33 is composed of a known sensor which detects a condition of the various drivers. The driver's state represents numerical information of the driver's state such as a degree of driver's wakefulness, a temperature of the driver, a driver's heart rate, etc.

The degree of the driver's wakefulness is calculated on the basis of a degree of the driver's concentration, the number of blinks, etc.

The driver of the own vehicle operates the set value input section 34 to input a degree of the driver's will of manual operation, and provide information regarding the degree of the driver's will of manual operation to the control section 10. It is possible for the driver of the own vehicle to transmit the driver's will to operate the own vehicle, i.e. to provide a degree of the driver's will to depend on the drive assist system 1 to the control section 10 through the set value input section 34.

The collision judgment section 35 detects whether the own vehicle will collide with an obstacle or another vehicle around the own vehicle on the road. The collision judgment section 35 transmits the collision detection result to the control section 10.

The control section 10 is composed of a known microcomputer which has a central processing unit 11 (CPU 11), a semiconductor memory (hereinafter, the memory 12) such as a random access memory (RAM), a read only memory (ROM), a flash memory, etc. The control section 10 executes programs stored in a non-transitory computer readable storage medium exemplified by the semiconductor memory 12.

The execution of the programs stored in the memory 12 provides the method according to the exemplary embodiment of the present invention which will be explained in detail later. Storage mediums using electromagnetic wave are eliminated from the non-transitory computer readable storage medium. It is acceptable for the control section 10 to have one or more microcomputers.

Figure 2:
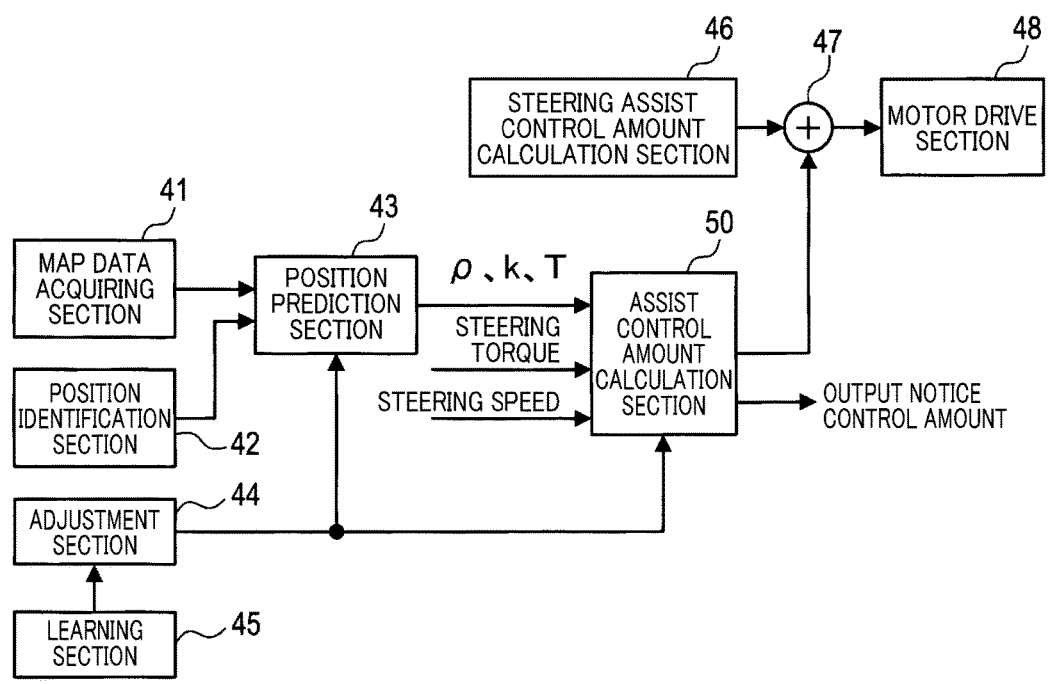
FIG. 2 is a block diagram showing functions of a control section 10 in the drive assist system 1 shown in FIG. 1.

FIG. 2 is a block diagram showing functions of the control section 10 in the drive assist system 1 according to the exemplary embodiment. As shown in FIG. 2, the control section 10 has plural functional blocks, i.e. a map data acquiring section 41, a position identification section 42, a position prediction section 43, an adjustment section 44, a learning section 45, an assist control amount calculation section 46, an addition section 47, a motor drive section 48, and an assist control amount calculation section 50.

That is, when executing the programs stored in the memory 12, the control section 10 provides the functions of those sections such as the map data acquiring section 41, the position identification section 42, the position prediction section 43, the adjustment section 44, the learning section 45, the assist control amount calculation section 46, the addition section 47, the motor drive section 48, and the assist control amount calculation section 50.

It is also acceptable to use one or more hardware devices so as to realize one or more functions of those sections 41 to 48 and 50. For example, when a function is realized by using a hardware device, it is acceptable to use a digital circuit, an analogue circuit, or a combination of a digital circuit and an analogue circuit composed of plural logical circuits.

The map data acquiring section 41 in the control section 10 of the drive assist system 1 according to the exemplary embodiment acquires road shape information from the map data base 25. The road shape information is used for determining the direction of the road on which the own vehicle is driving. The road shape information represents information to be used for obtaining the direction of the road. For example, the road shape information includes a curvature of the road, a degree of a slope of the road, etc. on which the own vehicle is driving.

The road shape information further includes a rear side position of the road at which the own vehicle has passed, the current position of the own vehicle on the road, and a forward position in front of the current position of the own vehicle on the road.

It is acceptable that the road shape information obtained by the map data acquiring section 41 corresponds to the road shape information which has been stored in the map database 25. It is also acceptable to obtain the road shape information on the basis of the information stored in the map database 25. Specifically, when the map database 25 has stored information regarding the curvature of the road and the degree of the slope of the road on which the own vehicle is driving, it is sufficient for the map data acquiring section 41 to acquire the information regarding the curvature of the road and the degree of the slope of the road from the map database 25. On the other hand, if the map database 25 does not store any information regarding the curvature of the road and the degree of the slope of the road, it is sufficient for the map data acquiring section 41 to generate the information regarding the curvature of the road and the degree of the slope of the road on the basis of coordinate information of a node and a link and use, as the road shape information, the generated information regarding the curvature of the road and the degree of the slope of the road on which the own vehicle is driving.

The position identification section 42 in the control section 10 of the drive assist system 1 according to the exemplary embodiment obtains a drive direction of the own vehicle and a speed of the own vehicle on the basis of the information transmitted from the GPS receiver 22 and the gyro sensor 24. The position identification section 42 further executes a matching process, i.e. an identification process so as to match the map data obtained from the map database 25 with the current position of the own vehicle.

The position prediction section 43 in the control section 10 of the drive assist system 1 according to the exemplary embodiment predicts a position of the own vehicle on the road in a future, and estimates the direction of the road on which the own vehicle is driving according to the road shape information on the basis of the results of the identification process of the position of the own vehicle, the driving direction and driving speed of the own vehicle.

The position prediction section 43 uses a steering timing T which is obtained by adding a predetermined setting-time period of N seconds to a current time. The position prediction section 43 acquires a curvature of the road at the position through which the own vehicle has passed t seconds before the steering timing T or through which the own vehicle would pass t seconds after the steering timing T. The larger the curvature of the road is, the smaller the curvature radius is. In this case, the current road changes to a sharp curve road.

Similarly, the position prediction section 43 obtains, i.e. calculates a degree k of a slope at the position of the road through which the own vehicle would pass N seconds later. The position prediction section 43 transmits the curvature p of the road, the degree k of the slope of the road and the steering timing T to the assist control amount calculation section 50

The adjustment section 44 acquires a driver's operation ability and load information of the own vehicle, and determines an assist control amount so that a necessary degree of the driver's operation increases when the driver's operation ability reduces or the load information of the own vehicle increases.

The necessary degree of the driver's operation represents a ratio of the assist amount to the amount of the driver's operation of the own vehicle.

The driver's operation ability represents driver's skill of the operation of the own vehicle, physical characteristics of the driver of the own vehicle, a degree of driver's wakefulness, driving characteristics of the own vehicle, a driving state of the own vehicle, etc.

The load information of the own vehicle represents a magnitude of force such as a speed, an acceleration, and a yaw rate of the own vehicle, to be applied to the own vehicle.

The learning section 45 learns an actual drive's operation start timing at a target position on the road on which the own vehicle is driving.

The target position is selected from one of plural positions such as an entrance position of a curve section on the road, a distance to an obstacle, etc. which have been determined in advance.

The entrance position of a curve section represents a position at which a curvature of a straight section on the road changes to a curvature of a curve section on the road.

The actual driver's operation start timing represents a position at which the driver starts the steering operation using the steering wheel or the acceleration operation of the own vehicle toward the target position, or a time length counted from a time when the driver starts to operate to a time when the own vehicle reaches the target position.

In more detail, the learning section 45 always monitors a timing when the driver of the own vehicle changes an acceleration of the own vehicle and a steering angle. When detecting the timing at which the driver of the own vehicle changes the acceleration and the steering angle, the learning section 45 calculates a first distance from the current position of the own vehicle to the entrance position of the curve section on the road, and also calculates a second distance to an obstacle, and stores the calculation results in the memory 12. The learning section 12 repeatedly calculates the first distance and the second distance previously described predetermined times or during a predetermined period of time, and stores them into the memory 12.

The steering assist control amount calculation section 46 calculates a steering assist control amount to be used by the steering control process. For example, like a known method and structure, the steering assist control amount calculation section 46 multiplies a steering torque and a predetermined gain together so as to obtain the steering assist control amount.

The addition section 47 adds the control amount calculated by the assist control amount calculation section 50 and the steering assist control amount calculated by the steering assist control amount calculation section 46.

When receiving the output value as the addition result of the addition section 47, the motor drive section 48 drives the steering motor 31 on the basis of the output from the addition section 47

The assist control amount calculation section 50 determines control parameters which represent a degree of steering operation to the steering wheel of the own vehicle according to the direction of the road so that the direction of the road matches with the drive direction of the own vehicle. The control parameters represent a control amount which affects the driver's steering operation using the steering wheel of the own vehicle.

For example, the control parameters include a resistance degree of the steering operation using the steering wheel, a steering stability of the steering operation, a turning ability of the own vehicle, steering set values, and in particular, a mechanical impedance of the steering mechanism. The steering mechanism transmits the power to the vehicle wheels of the own vehicle. The control parameters include an assist control amount.

The assist control amount calculation section 50 transmits control signals regarding the calculated assist control amounts to the steering motor 31, the notification section 32, etc. so as to execute the drive assist control of the own vehicle.

(Process)

Next, a description will be given of the adjustment process executed by the control section 10 in the drive assist device according to the exemplary embodiment with reference to FIG. 3.

Figure 3:
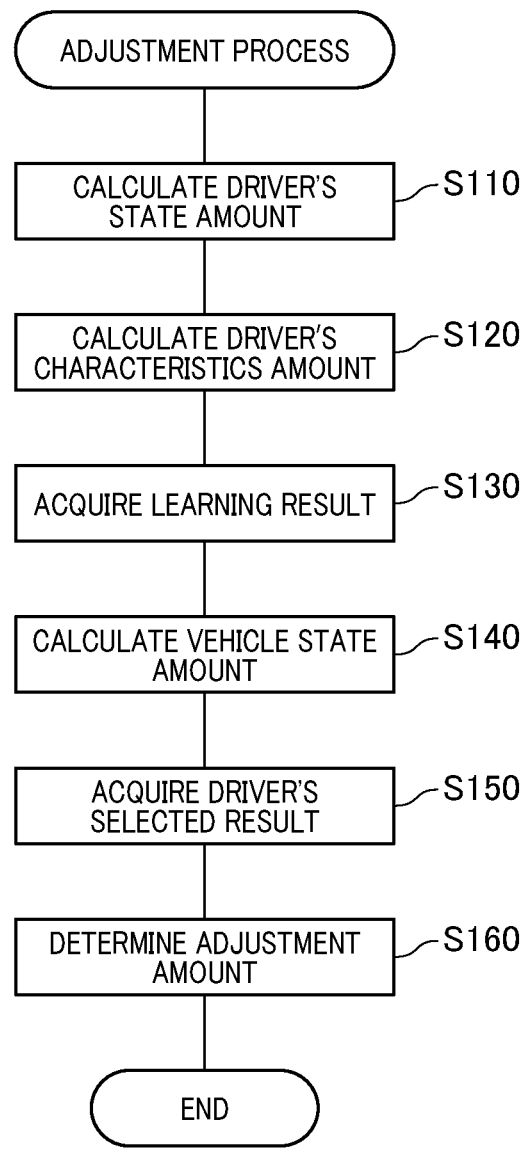
FIG. 3 is a flow chart showing an adjustment process executed by the control section 10 in the drive assist system 1 shown in FIG. 1.

FIG. 3 is a flow chart showing the adjustment process executed by the control section 10 in the drive assist system 1 shown in FIG. 1. The adjustment process shown in FIG. 3 corresponds to the function of the adjustment section 44 in the control device 10. The control section 10 starts to execute the adjustment process shown in FIG. 3 when an electric power is supplied to the drive assist system 1, and the control section 10 repeatedly executes the adjustment process shown in FIG. 3 while the power supply to the drive assist system 1 is continued.

In step S110 shown in FIG. 3, a driver's state amount is calculated. This driver's state amount represents the control amount regarding the driver's state which has been obtained by the driver's state detection section 33. In the exemplary embodiment, the driver's state amount has a value within a range of 0 to 1. The operation flow progresses to step S120.

A driver's characteristics amount is calculated in the process in step S120. The driver's characteristics amount has a numerical value and represents characteristics of the driver of the own vehicle. For example, the driver's characteristics amount has a value which represents a driving operation capability, sex, age, etc. of the driver of the own vehicle. The driver's characteristics amount has a value within a range of 0 to 1 due to a degree of the driving operation capability of the driver, the sex and age of the driver.

It is possible to determine the driving operation capability of the driver of the own vehicle on the basis of a difference between a predetermined driver's operation start timing and an actual driver's operation start timing, or a magnitude of variation of the steering angle when the own vehicle is driving on a curve section, or a time length counted from a timing when an obstacle is detected to a timing when the driver starts to operate the steering wheel. The degree of the driving operation capability is always detected by the process which will be explained later. The operation flow progresses to step S130.

In step S130, the adjustment section 44 receives a result of the learning process transmitted from the learning section 45. That is, as shown in FIG. 2, the adjustment section 44 receives the result of the learning process such as an average value of plural actual driver's operation start timings, etc. The operation flow progresses to step S140.

In step S140, the vehicle state amount is calculated. The vehicle state amount represents a magnitude of a load to be applied to the own vehicle when the driver operates the own vehicle. For example, the vehicle state amount includes a speed, an acceleration, a yaw rate, etc. of the own vehicle. The vehicle state amount has a value within a range of 0 to 1 due to the magnitude of the load applied to the own vehicle. The operation flow progresses to step S150.

In step S150, the driver's selected result is acquired. This driver's selected result represents the degree of the driver's will of manual operation acquired by the set value input section 34. The degree of the driver's will of manual operation has a value within a range of 0 to 1. The operation flow progresses to step S160.

In step S160, an adjustment output, i.e. the adjustment amount is determined. The adjustment output has a value due to the driver's state amount, the driver's characteristics amount, the vehicle state amount and the driver's selected result.

For example, it is acceptable to use, as the adjustment amount, an average value or a weighted value of the driver's state amount, the driver's characteristics amount, the vehicle state amount and the driver's selected result.

Further, it is acceptable to use the adjustment value which has been adjusted due to the learning state in the learning process, which will be explained later.

It is adjusted so that the magnitude of the adjustment output increases so as to increase the degree of the drive operation by the driver of the own vehicle according to the reduction of the driver's operation ability or increasing of the load applied to the own vehicle.

(Position Prediction Process)

Next, a description will be given of the position prediction process executed by the control section 10 with reference to FIG. 4.

Figure 4:
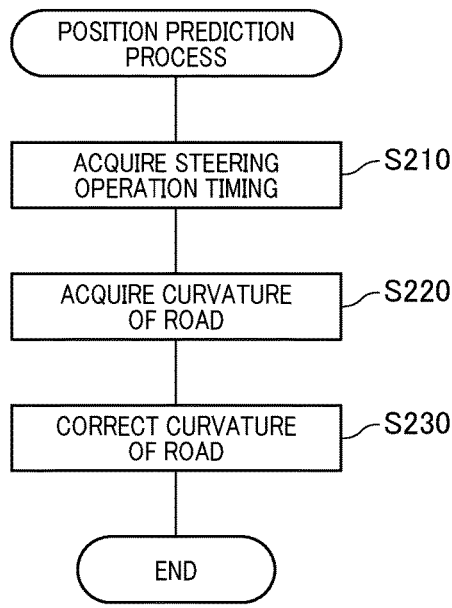
FIG. 4 is a flow chart showing a position prediction process executed by the control section 10 in the drive assist system 1 shown in FIG. 1.

FIG. 4 is a flow chart showing the position prediction process executed by the control section 10 in the drive assist system 1 shown in FIG. 1. The position prediction process shown in FIG. 4 corresponds to the function of the position prediction section 43 in the control device 10.

The control section 10 starts to execute the position prediction process shown in FIG. 4 when an electric power is supplied to the drive assist system 1, and the control section 10 repeatedly executes the position prediction process shown in FIG. 4 while the power supply to the drive assist system 1 is continued.

In step S210 shown in FIG. 4, a steering operation timing is acquired. This steering operation timing represents a timing for the driver of the own vehicle to start the steering operation according to the variation of the curvature of the road.

Figure 5:
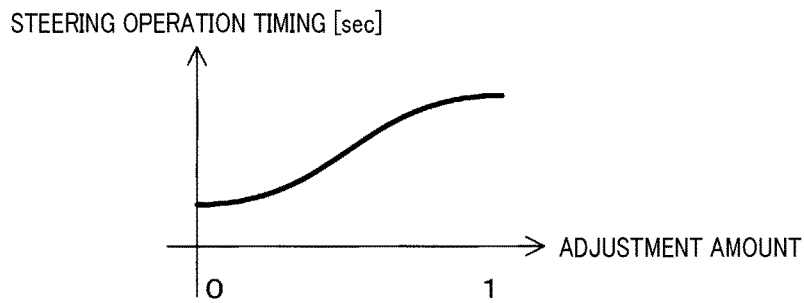
FIG. 5 is a view showing a relationship between a steering operation timing and an adjustment amount of a control parameter.

FIG. 5 is a view showing a relationship between the steering operation timing and an adjustment amount of a control parameter.

As shown in FIG. 5, the steering operation timing is reduced according to reduction of the adjustment amount so as to start the steering operation by the driver of the own vehicle at early time. The adjustment amount corresponds to a value of t seconds before or after the steering operation timing previously described. The operation flow progresses to step S220.

In step S220, the curvature of the road is acquired. In the process in step S220, the curvature of the current position on the road and a curvature of the position, through which the own vehicle would pass during a period from (N−t) seconds to (N+t) seconds are acquired from the map database 25. The operation flow progresses to step S230.

In step S230, the curvature of the road is corrected. In step S230, the curvature of the road is corrected so that the steering operation timing, which has been determined, coincides with the curvature of the road. Specifically, an average value of curvatures of the road during a period of time from (N−t) seconds to (N+t) seconds, and the average value of the curvature is used as the adjusted curvature of the road.

The adjusted curvature of the road represents a future position of the own vehicle, in other words, represents the prediction result of the target steering angle of the steering wheel.

Figure 6:
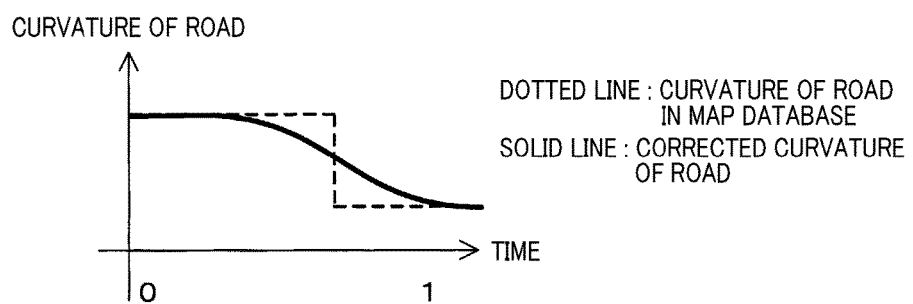
FIG. 6 is a view showing a relationship between a curvature of a road and a time.

FIG. 6 is a view showing a relationship between the curvature of the road and a time. As designated by the dotted line shown in FIG. 6, the curvature of the road drastically changes according to the elapsed of time. As designated by the solid line shown in FIG. 6, the curvature of the road is smoothed, and the curvature of the road varies at an early time. That is, the adjustment amount is reduced to become a small value, and the control operation is started at an early time when the degree of the driver's operation increases.

After the process in step S230, the control section 10 finishes the position prediction process shown in FIG. 4.

Next, a description will be given of the assist control process executed by the control section 10.

The assist control process determines the assist control amount for the steering operation and the assist control amount for the notification process. The assist control process corresponds to the function of the assist control amount calculation section 50 in the control device 10.

Figure 7:
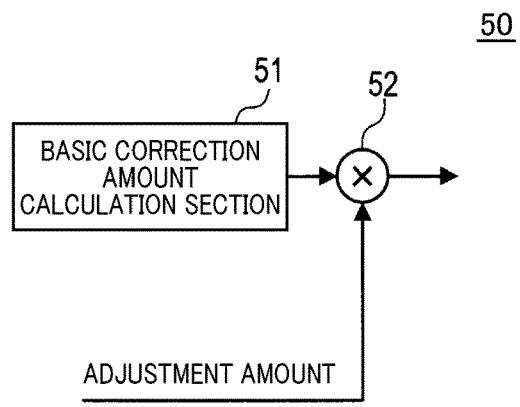
FIG. 7 is a block diagram showing a structure of an assist control amount calculation section 50 in the control device 10 for calculating a steering assist amount regarding the steering operation.
Figure 8:
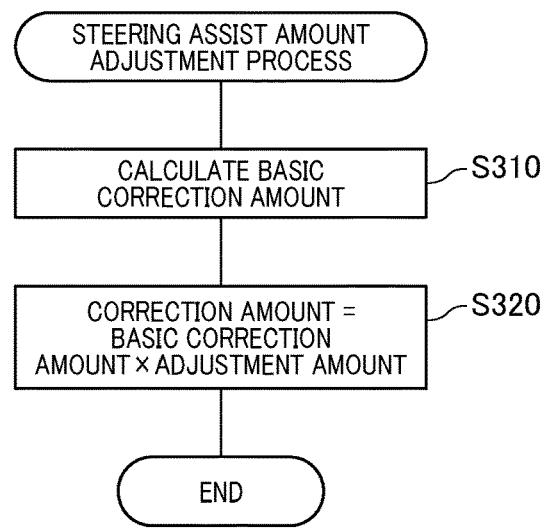
FIG. 8 is a flow chart showing a steering assist amount adjustment process executed by the control section 10 in the drive assist system 1 shown in FIG. 1.

FIG. 7 is a block diagram showing a structure of the assist control amount calculation section 50 in the control device 10 for calculating the steering assist control amount for the steering operation. FIG. 8 is a flow chart showing a steering assist amount adjustment process executed by the control section 10 in the drive assist system 1 shown in FIG. 1.

The control section 10 executes the steering control process which corresponds to the functions of a basic correction amount calculation section 51 and the function of a multiplication section 52 shown in FIG. 7.

In step S310 in the steering assist control amount adjustment process shown in FIG. 8, the basic correction amount is calculated. In more detail, the basic correction amount calculation section 51 calculates the basic correction amount as a correction control amount to be used for adjusting the steering assist control amount. It is acceptable to use a structure, which has been known in the power steering technical field, for adjusting the steering assist control amount. The control section 10 in the exemplary embodiment further adjusts the correction control amount. The basic correction amount calculation section 51 transmits the basic correction amount. The operation flow progresses to step S320.

In step S320, a multiplication section 52 multiplies the basic correction amount with the adjustment amount, and transmits a correction amount as the steering assist control amount. Because the basic correction amount is a negative value, the output of the addition section 47 increases according to reducing of an absolute value of the correction amount. That is, the steering assist control amount is determined to increase the steering assist amount according to the reduction of the driver's operation ability to the drive operation or increasing of the operating load of the own vehicle, and reduction of the adjustment amount.

Figure 9:
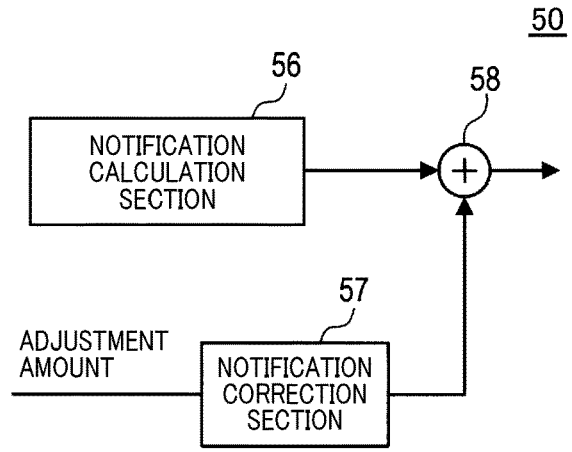
FIG. 9 is a block diagram showing another structure of the assist control amount calculation section 50 in the control device 10 for calculating a notification control amount.

FIG. 9 is a block diagram showing another structure of the assist control amount calculation section 50 in the control device 10 for calculating a notification control amount. FIG. 10 is a flow chart showing a notification process executed by the control section 10 in the drive assist system 1 shown in FIG. 1.

As shown in FIG. 9, the assist control amount calculation section 50 further has a notification calculation section 56, a notification correction section 57 and an addition section 58. The notification process shown in FIG. 10 corresponds to the function of the notification calculation section 56, the function of the notification correction section 57 and the function of the addition section 58. The assist control amount for notification is generated by the structure shown in FIG. 9.

In step S410 in the notification process shown in FIG. 10, the notification calculation section 56 calculates a basic notification amount. For example, the notification calculation section 56 determines the basic notification amount on the basis of a degree of collision possibility transmitted from the collision judgment section 35, a difference between a target steering angle due to a curvature of the road and an actual steering angle of the own vehicle, etc. The operation flow progresses to step S420.

In step S420, the notification correction section 57 acquires notification parameters. The notification parameters are determined due to an adjustment amount. In the notification process shown in FIG. 10, the notification correction section 57 acquires the notification amount which includes a notification timing, a notification strength, the number of notification, etc.

Figure 11A:
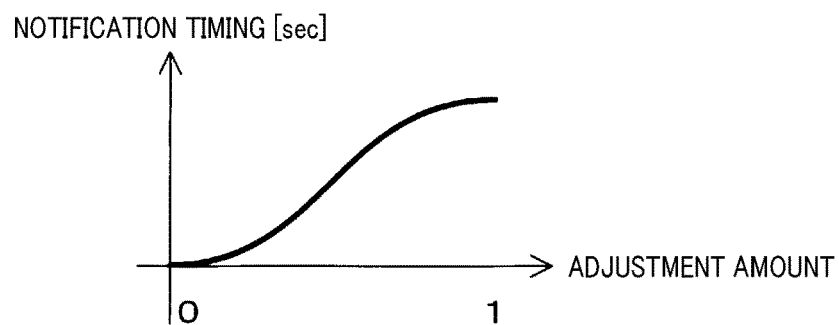
FIG. 11A is a view showing a relationship between a notification timing and the adjustment amount.
Figure 11B:
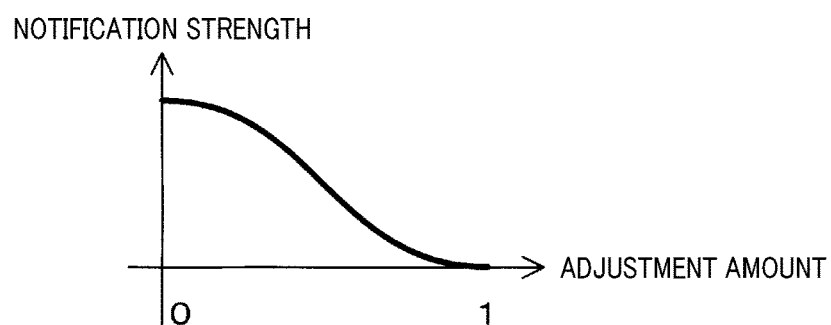
FIG. 11B is a view showing a relationship between a notification strength and the adjustment amount.
Figure 11C:
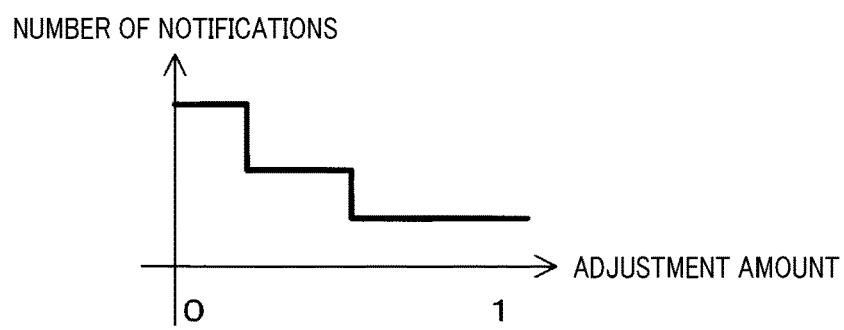
FIG. 11C is a view showing a relationship between the number of notifications and the adjustment amount.

FIG. 11A is a view showing a relationship between the notification timing and the adjustment amount. FIG. 11B is a view showing a relationship between the notification strength and the adjustment amount. FIG. 11C is a view showing a relationship between the number of notification and the adjustment amount.

Specifically, for example, as shown in FIG. 11A, the notification timing to start the notification becomes earlier according to the reduction of the adjustment amount.

Further, as shown in FIG. 11B, the notification strength becomes greater according to the reduction of the adjustment amount. For example, the notification strength represents a magnitude of sound, a size of image, or a magnitude of vibration, etc. to be supplied to the five senses of the driver and passengers of the own vehicle.

Still further, the number of notification is increased according to the reduction of the adjustment amount. That is, the assist control amount is increased to increase the notification amount to be supplied to the driver according to the reduction of the driver's operation ability or the increasing of the operating load of the own vehicle. The operation flow progresses to step S430.

In step S430, the notification correction section 57 calculates a notification correction amount on the basis of the acquired notification parameters in step S420.

Figure 12:
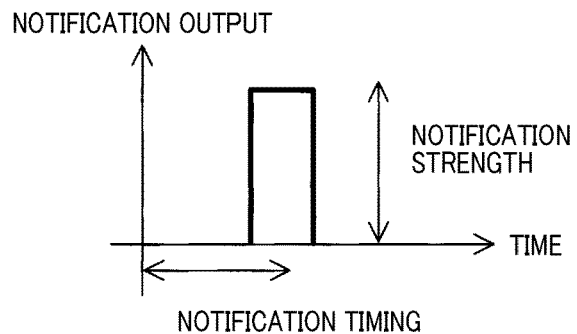
FIG. 12 is a view showing an example showing a relationship between the notification output and time.

FIG. 12 is a view showing an example showing a relationship between the notification output and time. As shown in FIG. 12, the notification correction section 57 calculates the notification timing, the notification strength, the number of notification on the basis of the acquired notification parameters. The operation flow progresses to step S440.

In step S440, the addition section 59 adds the basic notification amount and the notification correction amount together to generate the notification amount, and outputs the generated notification amount to the notification section 32.

(Learning Process)

A description will now be given of the learning process executed by the control section 10 with reference to FIG. 13.

Figure 13:
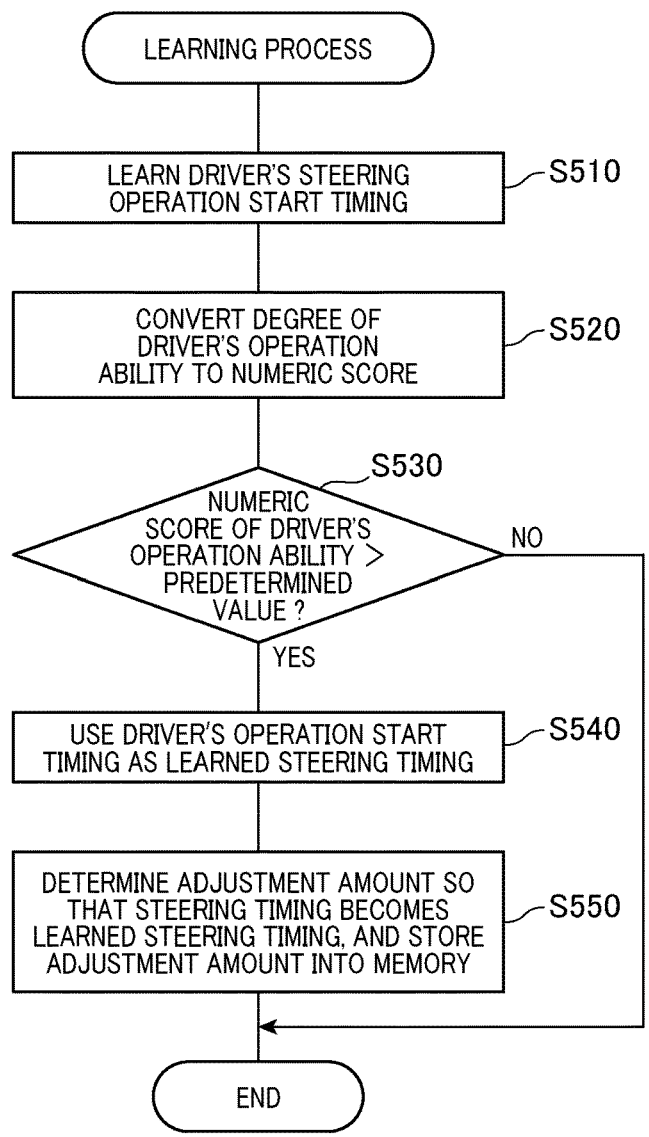
FIG. 13 is a flow chart showing a learning process executed by the control section 10 in the drive assist system 1 shown in FIG. 1.

FIG. 13 is a flow chart showing the learning process executed by the control section 10 in the drive assist system 1 shown in FIG. 1.

The learning process corresponds to the function of the learning section 45 in the assist control amount calculation section 50.

In the learning process determines the assist control amount so that the operation start timing obtained by the learning process or a timing earlier equal to the operation start timing coincides with the actual assist start timing when the driver's operation ability is not less than the predetermined degree of the operation ability.

In step S510 in the learning process shown in FIG. 3, the driver's steering operation start timing is learned. The operation flow progresses to step S510.

In step S520, a degree of the driver's operation ability is converted to a numeric score. For example, the driver's operation ability is increased when a specific difference is reduced, where this specific difference represents a difference between the predetermined timing and timing monitored results as a change time to start the acceleration or deceleration of the own vehicle and a time to change the steering angle. The operation flow progresses to step S530.

In step S530, the numeric score of the degree of the driver's operation ability is compared with the predetermined degree of the operation ability. This predetermined value is a threshold value so as to judge whether the driver's operation ability is high or low.

When the comparison result indicates that the numeric score of the driver's operation ability is not more than the predetermined degree of the operation ability, the control section 10 finishes the learning process shown in FIG. 13.

On the other hand, when the comparison result indicates that the numeric score of the driver's operation ability is more than the predetermined degree of the operation ability ("YES" in step S530), the operation flow progresses to step S540.

In step S540, the control section 10 determines and uses the driver's operation start timing to operate the steering wheel, etc. as a learned steering timing. The operation flow progresses to step S550.

In step S550, the control section 10 determines the adjustment amount so that the steering timing becomes the learned steering timing, and stores the adjustment amount into the memory 12. The control section 10 finishes the learning process shown in FIG. 13.

(Effects of the Drive Assist System 1 According to the Exemplary Embodiment)

The drive assist system 1 according to the exemplary embodiment has the following effects.

(1a) The control section 10 in the drive assist system 1 according to the exemplary embodiment acquires at least one of the driver's operation ability of the own vehicle and the operating load of the own vehicle. Further, the control section 10 determines the assist control amounts as the control parameters so that the degree of the drive operation by the driver of the own vehicle increases according to the reduction of the driver's operation ability or increasing of the load applied to the own vehicle. The control section 10 transmits the determined assist control amounts to the assist sections such as the steering motor 31 and the notification section 32 (see FIG. 1) so as to execute the drive assist process.

The drive assist system 1 having the structure previously described increases the magnitude of the assist control amounts so as to increase the degree of the drive operation by the driver of the own vehicle according to the reduction of the driver's operation ability or increasing of the load applied to the own vehicle. This control executes appropriate drive assist and provides comfortable drive assist control to the driver of the own vehicle.

(1b) In the drive assist system 1 having the structure previously described, the control section 10 determines control amounts for the steering operation as the assist control amounts, and transmits the determined assist control amounts to the assist sections such as the steering motor 31 and the notification section 32 (see FIG. 1) so as to execute the drive assist process.

The drive assist system 1 having the structure previously described executes the appropriate drive assist regarding the steering operation of the own vehicle.

(1c) In the drive assist system 1 having the structure previously described, the control section 10 adjusts the assist control amounts so that the assist start timing becomes earlier according to reduction of the driver's operation ability or increasing of the operating load of the own vehicle.

This makes it possible to start the drive assist early according to the reduction of the driver's operation ability or increasing of the operating load of the own vehicle.

(1d) In the drive assist system 1 having the structure previously described, the control section 10 determines the steering assist control amount to increase the steering assist amount according to the reduction of the driver's operation ability to the drive operation or increasing of the operating load of the own vehicle.

In the drive assist system 1 having the structure previously described, because the magnitude of the assist amount for the driver's steering operation is increased according to the reduction of the driver's operation ability or the increasing of the operating load of the own vehicle. That is, the drive assist system 1 can reduce the driver's load of vehicle operation when it is predicted for the driver's operation of the own to become difficult.

(1e) In the drive assist system 1 having the structure previously described, the control section 10 determines the assist control amount to increase the notification amount to the driver of the own vehicle according to the reduction of the driver's operation ability or the increasing of the operating load of the own vehicle. This control makes it possible to transmit the assist control amount to the assist sections such as the steering motor 31 and the notification section 32 (see FIG. 1) so as to execute the drive assist process.

In the drive assist system 1 having the structure previously described, because the magnitude of the notification amount is increased according to the reduction of the driver's operation ability or the increasing of the operating load of the own vehicle. That is, the drive assist system 1 can draw the driver's attention to support the safe driving of the own vehicle.

(1f) In the drive assist system 1 having the structure previously described, the control section 10 learns the driver's operation start timing for the target position or the presence of an obstacle, and at least acquires the driver's operation ability. When the detection result indicates that the acquired driver's operation ability is not less than the predetermined degree of the operation ability, the control section 10 determines the assist control amount so that the actual assist start timing becomes equal to the driver's operation start timing obtained by the learning process.

The drive assist system 1 having the structure previously described makes it possible to provide the comfortable drive assist to the driver of the own vehicle without feeling uncomfortable because the operation start timing obtained by the learning process is determined to be fitted with the actual driver's operation start timing when the driver's operation ability of the own vehicle is high.

Other Modifications

A description will now be given of various modifications of the drive assist system 1 as the drive assist device according to the exemplary embodiment. It is acceptable for the drive assist system 1 as the drive assist device according to the exemplary embodiment to have the following various modifications.

(2a) In the drive assist system 1 according to the exemplary embodiment having the structure previously described, the control section 10 executes the drive assist as the steering assist of the steering wheel, etc. However, the concept of the present invention is not limited by this structure. It is acceptable for the control section 10 in the drive assist system 1 to execute the assist for acceleration of the own vehicle, and the assist for safe drive of the own vehicle.

(2b) It is acceptable to combine the plural functions of one section in the control section 10 to plural components, or to divide one function of one section in the control section 10 to plural components.

Further, it is also acceptable to combine the plural functions of the sections in the control section 10 to a single component, or to form one function, which is obtained by plural components, by using a single component. It is also acceptable to add a part of the components forming the control section 10 to another component or components.

(2c) It is possible to realize the drive assist system 1, or the control section 10 previously described by using programs and/or a non-transitory computer readable storage medium for storing those programs for causing a central processing unit in a computer system to execute the functions previously described.

(Correspondence)

As previously described, the drive assist system 1 used in the exemplary embodiment corresponds to the drive assist device. The steering motor 31 and the notification section 32 correspond to the assist sections. The assist control amount calculation section 50 corresponds to the assist execution section.

The processes in steps S110, S120 and S140 executed by the control section 10 correspond to the ability acquiring section. The process in step S160 executed by the control section 10 corresponds to the control amount determination section.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A drive assist device which executes a drive assist of an own vehicle, comprising a computer system including a central processing unit, the computer system being configured to provide:

an ability acquiring section which acquires at least one of a driver's operation ability to the own vehicle and an applying load to the own vehicle, the driver's operation ability to the own vehicle representing driver's characteristics and a driver's state, and the applying load to the own vehicle representing loads to be applied to the own vehicle obtained on the basis of a current speed, an acceleration and a yaw rate of the own vehicle detected by a speed sensor and a gyro sensor mounted on the own vehicle;

a control amount determination section which determines an assist control amount of the drive assist of the own vehicle so as to increase a degree of the driver's operation to the own vehicle according to reduction of the degree of the driver's operation ability, and increasing of the applying load to the own vehicle;

an assist execution section which transmits the assist control amount to an assist section in order to execute drive assist for the own vehicle; and a learning section which learns a driver's operation start timing of the own vehicle on the basis of images acquired by an in-vehicle camera mounted on the own vehicle when the driver of the own vehicle detects recognizes presence of a target point on a road on which the own vehicle is driving, wherein the assist section comprises a steering motor and a notification section mounted on the own vehicle, wherein the control amount determination section determines a steering motor instruction torque of the steering motor and a notification instruction to the notification section as the assist control amount, wherein the ability acquiring section acquires at least the driver's operation ability to the own vehicle, and when the acquired driver's operation ability to the own vehicle is not less than a predetermined level, the control amount determination section adjusts the assist control amount in order to obtain the assist start timing determined on the basis of the driver's operation start timing learned by the learning section.

2. The drive assist device according to claim 1, wherein the control amount determination section determines a steering control amount as the assist control amount, and the assist execution section transmits the assist control amount determined by the control amount determination section to the assist section so as to perform the drive assist of the steering motor in the own vehicle.

3. The drive assist device according to claim 1, wherein the control amount determination section determines a control value as the assist control amount so as to advance an assist start timing, at which the drive assist is started, according to reduction of the driver's operation ability to the own vehicle or increasing of the applying load to the own vehicle.

4. The drive assist device according to claim 2, wherein the control amount determination section determines a control value as the assist control amount so as to advance an assist start timing, at which the drive assist is started, according to reduction of the driver's operation ability to the own vehicle or increasing of the applying load to the own vehicle.

5. The drive assist device according to claim 1, wherein the control amount determination section determines the assist control amount to be supplied to the steering motor in the assist section so as to increase a magnitude of the drive assist according to the reduction of the driver's operation ability to the own vehicle or the increasing of the applying load to the own vehicle.

6. The drive assist device according to claim 2, wherein the control amount determination section determines the assist control amount to be supplied to the steering motor in the assist section so as to increase a magnitude of the drive assist according to the reduction of the driver's operation ability to the own vehicle or the increasing of the applying load to the own vehicle.

7. The drive assist device according to claim 3, wherein the control amount determination section determines the assist control amount to be supplied to the steering motor in the assist section so as to increase a magnitude of the drive assist according to the reduction of the driver's operation ability to the own vehicle or the increasing of the applying load to the own vehicle.

8. The drive assist device according to claim 1, wherein the control amount determination section determines the assist control amount to be supplied to the notification section in the assist section so as to increase a magnitude of notification to be provided to the driver of the own vehicle according to the reduction of the driver's operation ability to the own vehicle or the increasing of the applying load to the own vehicle, and the assist execution section transmits the assist control amount to the notification section in the assist section so as to perform notification to the driver of the own vehicle.

9. The drive assist device according to claim 2, wherein
the control amount determination section determines the assist control amount to be supplied to the notification section in the assist section so as to increase a magnitude of notification to be provided to the driver of the own vehicle according to the reduction of the driver's operation ability to the own vehicle or the increasing of the applying load to the own vehicle, and
the assist execution section transmits the assist control amount to the notification section in the assist section so as to perform notification to the driver of the own vehicle.

10. The drive assist device according to claim 3, wherein
the control amount determination section determines the assist control amount to be supplied to the notification section in the assist section so as to increase a magnitude of notification to be provided to the driver of the own vehicle according to the reduction of the driver's operation ability to the own vehicle or the increasing of the applying load to the own vehicle, and
the assist execution section transmits the assist control amount to the notification section in the assist section so as to perform notification to the driver of the own vehicle.

* * * * *